United States Patent [19]

Hansen et al.

[11] 4,409,789
[45] Oct. 18, 1983

[54] POWER STEERING SYSTEM

[75] Inventors: Howard C. Hansen; Willard L. Chichester, both of Battle Creek, Mich.

[73] Assignee: Clark Equipment Company, Buchanan, Mich.

[21] Appl. No.: 202,923

[22] Filed: Nov. 3, 1980

[51] Int. Cl.³ .................. F16D 31/02; B62D 5/04; B62D 5/06
[52] U.S. Cl. ..................... 60/384; 60/473; 60/476; 180/142
[58] Field of Search .............. 417/410; 60/473, 476, 60/465, 431, 384; 180/142

[56] References Cited

U.S. PATENT DOCUMENTS

| Re. 25,291 | 12/1962 | Charlson | 418/61 R |
|---|---|---|---|
| 2,962,108 | 11/1960 | Bidwell | 180/142 |
| 2,979,148 | 4/1961 | Bidwell | 180/142 |
| 3,011,579 | 12/1961 | Milliken et al. | 180/142 |
| 3,173,253 | 12/1964 | Gibson et al. | 180/145 |
| 3,651,885 | 3/1972 | Lang | 180/142 |
| 4,109,679 | 8/1978 | Johnson | 60/384 |
| 4,355,505 | 10/1982 | Liebent | 60/384 |

Primary Examiner—Richard E. Gluck
Attorney, Agent, or Firm—Marmaduke A. Hobbs; Raymond W. Campbell

[57] ABSTRACT

A power steering system, particularly advantageous for use on electric powered vehicles, in which the hydraulic pump operates only when steering commands are given. Torque applied to the steering shaft by rotation of the steering wheel is translated to axial stress on a thin walled tube, the direction and intensity of which depend on the direction and amount of steer angle change commanded. The axial stresses are detected by strain gages, and the motor which powers the hydraulic pump is activated only when stress is detected. Manual steering inputs enter the pump on one side, and the powered servo motor inputs enter on the opposite side, thus permitting the vehicle to be steered by manual input alone if the powered input fails. The components of the system are arranged in coaxial alignment, providing a compact system with improved heat dissipation qualities.

17 Claims, 7 Drawing Figures

POWER STEERING SYSTEM

BACKGROUND OF THE INVENTION

Power steering systems are used on many types of vehicles, including fork lift trucks and other industrial vehicles, for providing assistance to the operator in maneuvering the vehicle. The most common types of power steering systems are hydraulic, having a hydraulic pump which is driven by a V-belt from the engine or the accessory power section in a vehicled powered by an internal combustion engine, or by a separate electric motor in an electrically powered vehicle. The pump functions continously while the vehicle is being operated, thereby providing continuous hydraulic power to the steering system. If no steering commands are initiated by the operator of the vehicle, the fluid circulates freely within the system; however, if a steering command is given by the operator, the circulating hydraulic fluid is directed to one or the other side of a hydraulic steer cylinder. The cylinder is mechanically linked to a pitman arm or other linkage in the steering mechanism of the vehicle, and controls the position of the steer wheels of the vehicle.

The hydraulically operated power steering systems which are commonly used and have continuously operating hydraulic pumps, perform satisfactorily in providing power assisted steering; however, certain objectionable features are associated with these systems. The continuously operating hydraulic pump is energy wasteful, in that frequently no steering commands are given by the operator for relatively long periods of time, yet the pump operates continuously and circulates hydraulic fluid which is not required and serves no useful purpose at that time. The energy consumed in operating the pump is completely wasted when steering commands have not been given. In a vehicle powered by an internal combustion engine, whether of the gasoline, diesel, or propane type, as a result of the continuously operating pump, a greater amount of fuel is consumed than if the pump operated only when steering commands were given and pressurized fluid was needed. Hence, fewer miles of travel and operating hours per quantity of fuel are obtained because of the continuously operating pump. In electrically powered vehicles, the continuously operating hydraulic pump creates other undesirable effects. The energy loss from the electrical system to power the pump is dissipated in the form of heat, which can add to the discomfort of the operator, especially if the vehicle is being used in an already warm working environment. Additionally, it is desirable in electric vehicles to match all of the operating equipment, including the hydraulic power steering pump and motor, for the highest possible efficiency at the most economical size, thereby minimizing energy consumption. Normally, this would require a relatively small pump and motor operating at relatively high speeds. Such a combination has been found to be objectionable, however, in that the operation thereof results in higher noise levels than are desirable. Thus, pumps and motors which are larger than the optimal size have been used, since the larger pumps and motors can operate at slower and less noisy speeds. The larger pumps and motors are not only less efficient, thus resulting in higher energy consumption than small pumps and motors, but the larger pumps and motors are also more costly to obtain the install, hence adding to the overall vehicle cost.

SUMMARY OF THE INVENTION

The present invention overcomes many of the objectionable features inherent in the hydraulic power steering systems previously used, principally by providing means whereby the hydraulic pump of the power steering system is activated only when steering commands are given. Hence, if no steering commands are given, the pump does not operate, energy is not wasted and other undesirable effects such as heat and noise generation are substantially reduced. In the present power steering system, steering input signals in the form of torque are translated to axial stress on a tube, the ends of which experience either axial compression or tension, depending upon the direction of steering point. Strain gages on the tube in a Wheatstone bridge connection detect the steering input signals as to both direction and rate, and transmit the signals to a bi-directional amplifier for activation of a servo motor which operates the pump. When no steering inputs are given the strain gages detect neither axial compression nor tension, and the servo motor is not activated; hence, the pump does not operate. Suitable hydraulic circuitry is disclosed for the system.

Further characteristics of the present power steering system are revealed by the following objects of the invention, of which one of the principal objects is to provide a power steering system for vehicles which is particularly appropriate for use on industrial vehicles of the electrically powered type, and which has an increased system efficiency through the use of a hydraulic pump that is properly sized for maximum efficiency and that operates only when steering commands are given by the vehicle operator.

Another object of the present invention is to provide an arrangement of components in a hydraulic power steering system which results in an overall reduction compared to previous systems in the space required for the system within the vehicle, and which provides manual and powered servo gear motor inputs to opposite ends of the hydraulic pump.

A further object of the present invention is to provide a power steering system which reduces the irritating noise and heat generation commonly associated with hydraulic power steering systems, and which has improved heat dissipation qualities over previous hydraulic power steering systems.

Yet another object of the present invention is to provide a hydraulic circuit for power steering systems which has high temperature pressure relief of the circulating hydraulic fluid and relief of overpressurization in either side of the circuit caused by bottoming out of the steer cylinder, and which may be either load reactive or nonreactive.

A yet further object of the present invention is to provide a power steering system for electric vehicles which permits manual steering of the vehicle even if electrical power to the system is interrupted, which can be installed in industrial vehicles or the like at cost savings over previous power steering systems, and which has an increased service life expectancy over the previous systems.

Additional objects and advantages of the present invention will become apparent from the following detailed description and the accompanying drawings.

DETAILED DESCRIPTION OF PREFERRED EMBODIMENT

Figure 1:
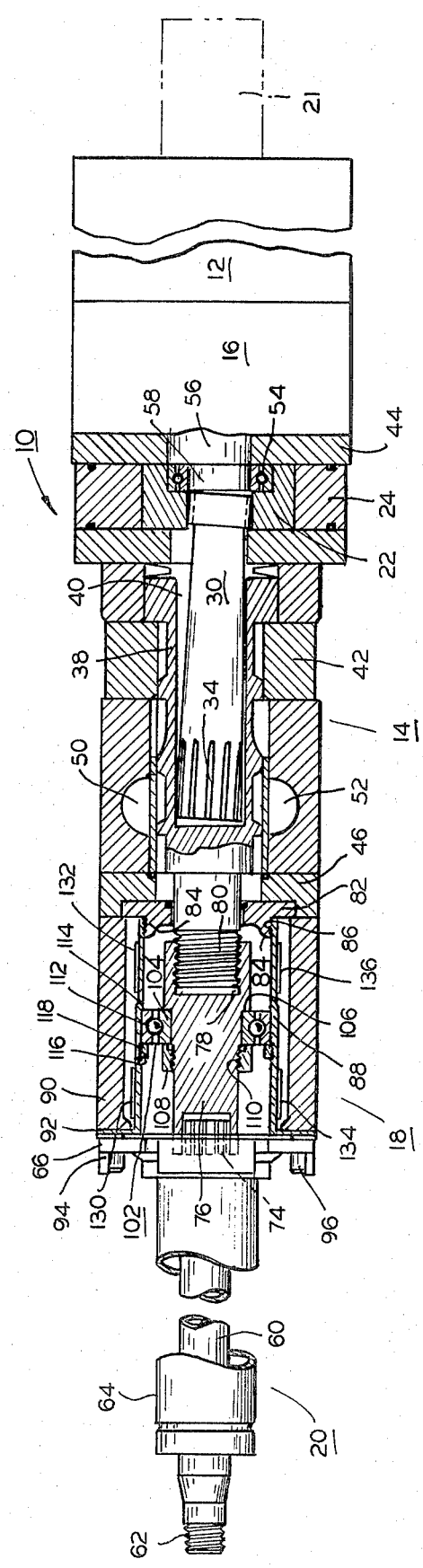
FIG. 1 is a cross sectional view of a power steering system embodying the present invention.
Figure 3:
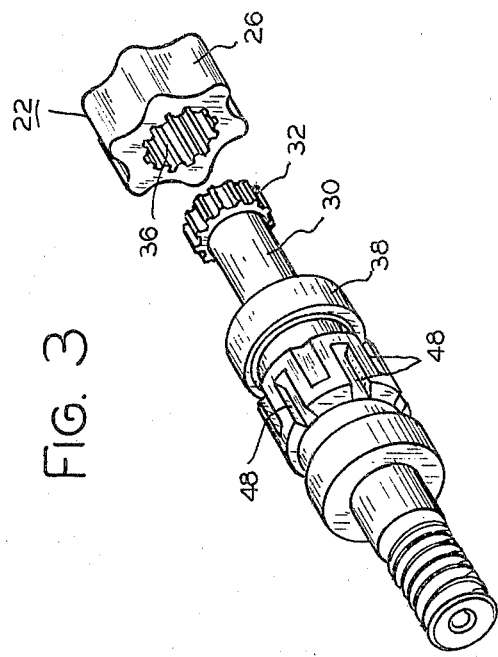
FIG. 3 is a perspective view of the pump shaft and rotor of the power steering system.
Figure 2:
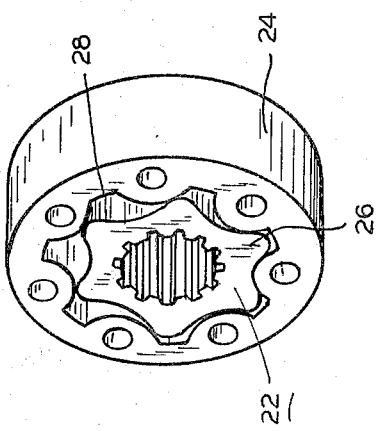
FIG. 2 is a perspective view of a stator and rotor of an orbit pump which may be used advantageously in the present invention.

Referring now more specifically to the drawings, and to FIG. 1 in particular, numeral 10 designates a power steering system embodying the present invention which may be used on any vehicle, but which is particularly advantageous when used on industrial vehicles such as electric fork lift trucks and the like. Some of the particular advantages of the present system when used on electric industrial vehicles include increased efficiency, decreased noise generation, more efficient heat dissipation, extended service life, minimized space requirements and decreased initial system cost.

Steering system 10 includes a bi-directional servo motor 12 connected to drive a hydraulic pump 14 through a reduction gear box 16. A steering input sensing mechanism 18 is connected between a steering shaft assembly 20 and pump 14 for detecting the steering commands which occur when the steering wheel is turned by the vehicle operator and for transmitting the commands mechanically to the pump and electrically to the servo motor. The servo motor output is measured by a tachometer 21, and the measurements therefrom are used in correcting the servo motor output, if required.

Pump 14 is a fixed displacement pump, preferably of the orbit type, having a rotor 22 operating in a stator 24. In the orbit pump, rotor 22 revolves about the center line of stator 24 as it orbits in the stator. Rotor 22 has six lobes 26, and stator 24 has seven chambers 28 for receiving lobes 26; hence, for each orbit of the rotor within the stator, the rotor also revolves one-sixth of a turn about the center line of the stator, but in the opposite direction to the direction of the orbit. Thus, the rotor must make six orbits within the stator to complete one full revolution about the center line of the stator. A shaft 30 has male splines 32 and 34 on the ends thereof. Splines 32 engage with female splines 36 in rotor 22. A rotary shaft 38 has a deep longitudinal bore 49 with female splines at the depth of the bore, and male splines 34 on shaft 30 engage with the splines at the depth of bore 40. Male splines 32 and 34 of shaft 30 are shaped to permit the shaft to wobble with respect to the female splines in bore 49 of rotary shaft 38 and female splines 36 of rotor 22. Thus, splines 34 at one end of shaft 30 wobble at the depth of bore 40 as the shaft rotates, and splines 32 at the opposite end of shaft 30 wobble in rotor 22 as the rotor with shaft 30 connected thereto revolves and orbits within the stator.

A housing 42 having end plates 44 and 46 which mate with gear box 16 and steering input sensing mechanism 18, respectively, surrounds shaft 30 and rotary shaft 38. Rotary shaft 38 has a series of grooves and recesses 48 in the outer surface thereof for transferring the hydraulic fluid between ports 50 and 52 in housing 42, one of which is the input port and the other of which is the output port, depending on the direction of operation of the bi-directional servo motor and the direction of fluid flow required for the steering command given. A bearing 54 is journaled in a bore of rotor 22 on the same center line as the splines of the rotor, and an output shaft 56 from gear box 16 has an eccentric end 58 which mates with the inner race of bearing 54. Thus, rotation of shaft 56 causes eccentric end 58 to move in an orbital path, thereby orbiting rotor 22 within stator 24 about the center line of the pump. One complete rotation of shaft 56 results in one orbit of rotor 22, thereby causing the rotor to move one sixth of a full revolution in the opposite direction, as previously described. The one-sixth of a revolution is transmitted to rotary shaft 38 by shaft 30 in the one to minus six ratio explained previously.

Reduction gear box 16 may be of any suitable type; however, the preferred arrangement is a planetary gear system with a reduction ratio of about six. The bi-directional servo motor 12 is a direct current electric motor, preferably of the permanent magnet type, having a moving coil type of armature optimized for low inertia which can accelerate from 0 to 1,000 rpm in about one millisecond. With the six to one mechanical advantage from gear box 16 and the six to one ratio of orbit pump 14, servo motor 12 has a 36 to 1 mechanical advantage in driving rotary shaft 38.

Steering shaft assembly 20 includes a steering shaft 60 having a threaded end 62 to which a steering wheel, not shown, is attached. A shroud 64 encloses shaft 60 and has a flange 66 at the bottom thereof which mates with steering input sensing mechanism 18. The end of steering shaft 60 opposite from threaded end 62 has male splines 74 which mate with female splines in a intermediate shaft 76 for sensing mechanism 18. The intermediate shaft has a bore with female threads 78 which engage with a threaded end 80 of rotary shaft 38. End plate 46 of pump 14 has an insert 82 with an outwardly extending externally threaded flange 84 which forms a threaded connection 86 with an internally threaded, thin walled metal tube 88. A housing 90 surrounds tube 88, and a flange 92 extends outwardly from the end of tube 88 and is disposed between flange 66 of shroud 64 and housing 90. Bolts 94 and 96 extend through flange 66 of shroud 64, flange 92 of tube 88, and housing 90, and are secured by threaded attachment into end plate 46 of pump 14. Thus, tube 88 is securely held within housing 90 by the threaded attachment to flange 84 at one end of the tube and by the securement of flange 92 between flange 66 and housing 90 at the other end of the tube. In this position, longitudinal movement of the tube as a whole is limited.

Intermediate shaft 76 is supported within tube 88 by a roller bearing 102 which provides radial support and carries thrust loads from either direction parallel to the center line of the steering system. Inner race 104 of bearing 102 is snugly fitted on shaft 76 and is supported in the direction of pump 14 against a shoulder 106 on the shaft. A nut 108 forms a threaded attachment 110 with shaft 76 and holds the bearing against shoulder 106. Outer race 112 of bearing 102 is snugly fitted within tube 88 and is held against an internal shoulder 114 of tube 88 by a retaining ring 116 which forms a threaded attachment 118 with the tube.

Bearing 102 is fixed in this position between shaft 76 and tube 88 at the midpoint along the length of the tube. The manner in which steering shaft 60 is attached to intermediate shaft 76 and rotary 38, and the connection of one end of tube 88 to the pump housing end plate, and the other end of the tube between the sensing mechanism housing and steering shaft assembly, causes one end of the tube to undergo axial compression and the other end of the tube to undergo axial tension whenever a torque is applied to steering shaft 60 by turning of the steering wheel. The direction at which the torque is applied, such as for a right or left hand turn, determines which end of the tube experiences compression and which experiences tension. Strain gages 130, 132, 134 and 136 are bonded to the external surface of tube 88 at suitable locations for sensing the axial stresses on the tube. Suitable resin gages include uniaxial strain gages of either the wire or foil type; two element rosettes of a stacked foil, planar foil and shear planar foil type; three element rosettes of the 60° planar foil and 45° stacked wire type; or four element rosettes, all of which are well known to those familar with the art. The electrical resistance of a wire, such as the semi-conductor strain gages used in the present invention, changes with changes in its length, and in the present steering system, as the tube undergoes axial tension or compression, the resistances of the strain gages change. The gages are wired in a conventional Wheatstone bridge circuit to provide maximum output and inherent temperature compensation.

Figure 4:
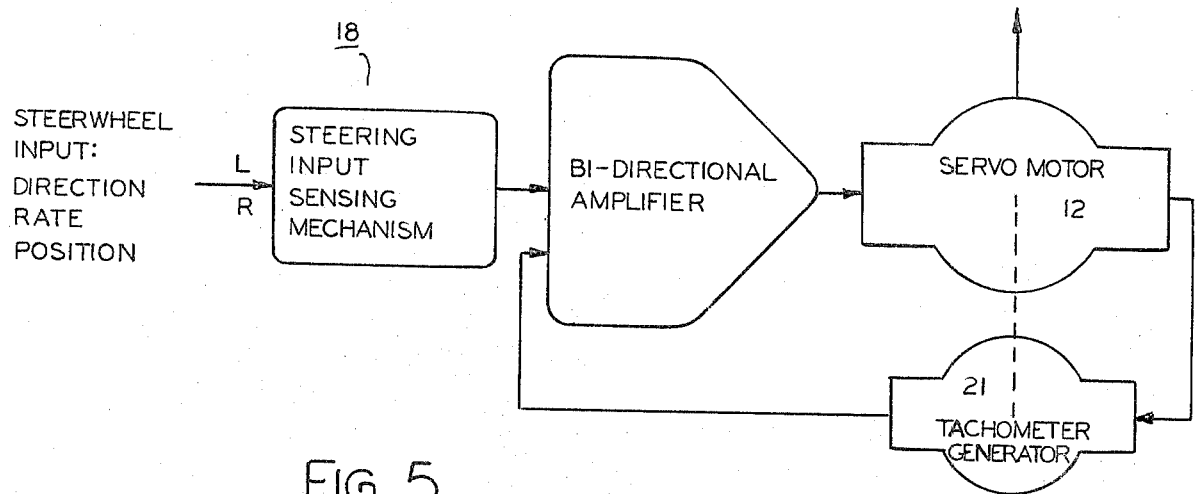
FIG. 4 is a flow diagram of servo control circuitry which may be used in the present invention.

Speed and torque control of servo motors is a well known art, and FIG. 4 is a diagrammatical drawing of a suitable closed loop control system which may be used in the present steering mechanism. The left or right hand input from the steering wheel is detected by the steering input sensing mechanism 18 and is transmitted to a bi-directional amplifier which relays a signal to operate servo motor 12. The motor output is measured by tachometer 21 and is relayed back to the bi-directional amplifier for comparison against the desired motor output. Any deviation from the desired result is amplified and used for correcting the error. Suitable dynamic braking and damping are incorporated in the system and they, as well as other features, such as torque limiting which may be either desirable or required, are well known in the servo motor control art.

Figure 5:
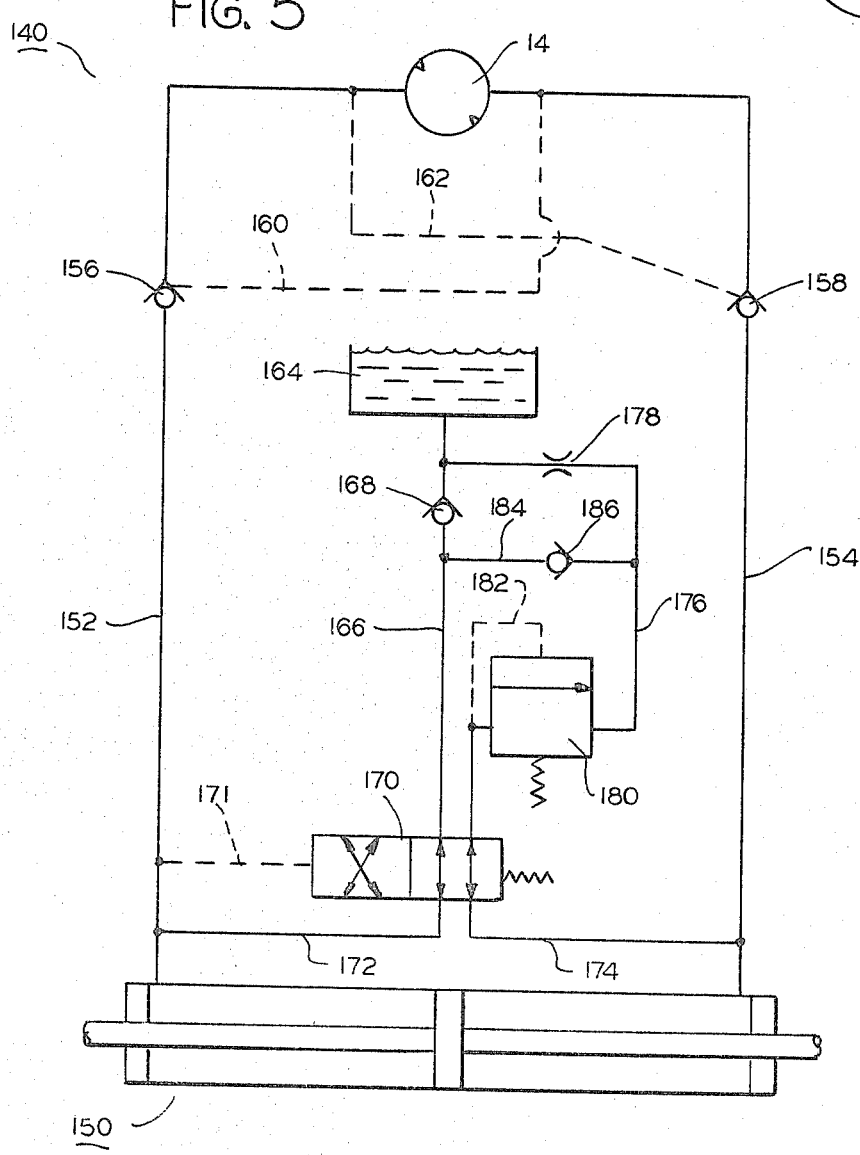
FIG. 5 is a schematic drawing of one hydraulic circuit which may be used advantageously in the present steering system.
Figure 6:
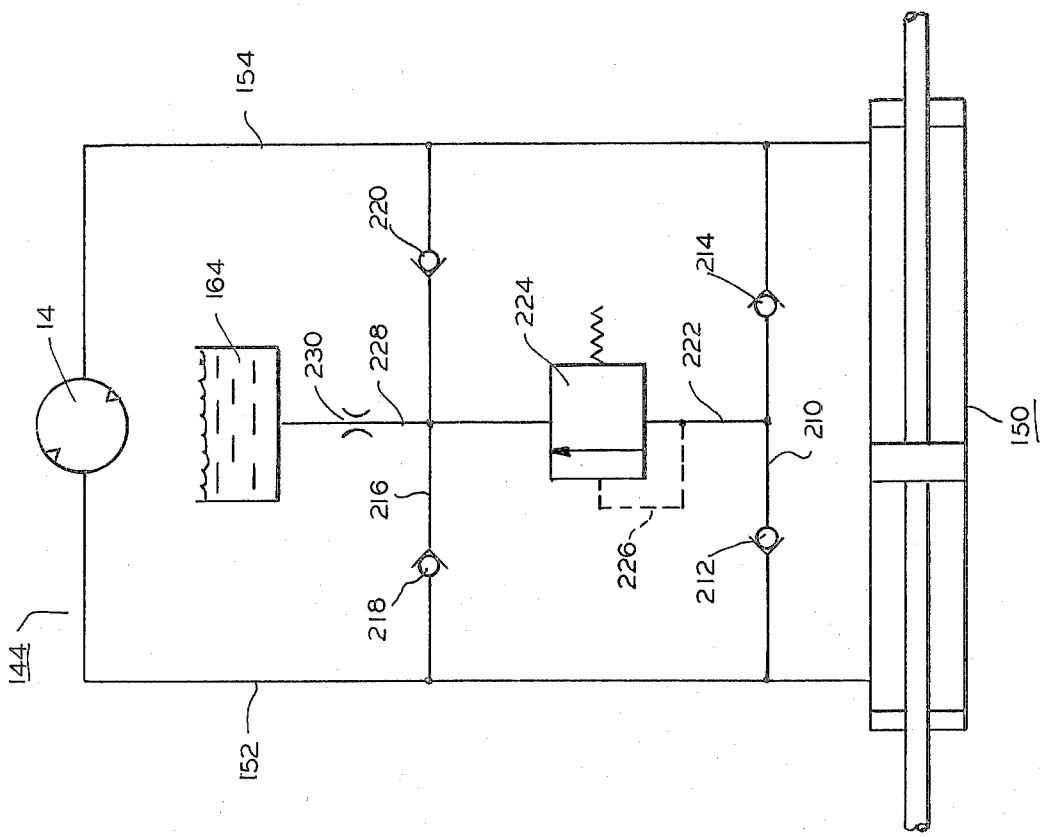
FIG. 6 is a schematic drawing of another hydraulic circuit which may be used advantageously in the present invention.
Figure 7:
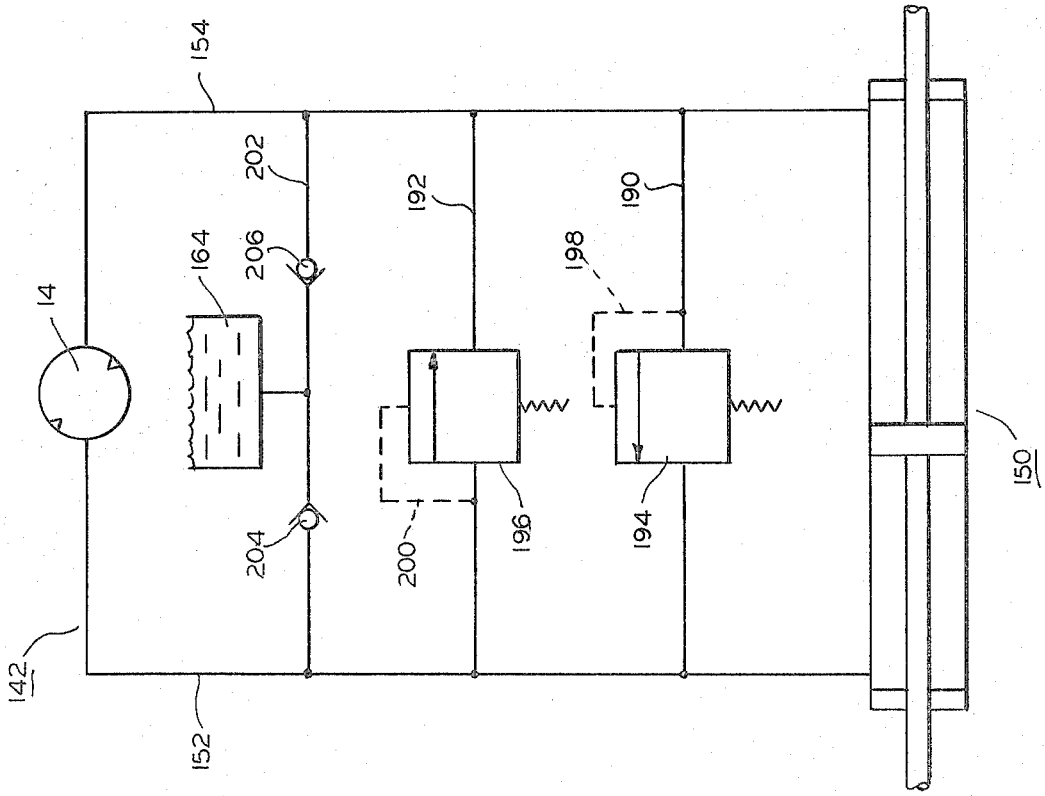
FIG. 7 is a schematic drawing of yet another hydraulic circuit which may be used in the present invention.

FIGS. 5, 6 and 7 are schematic diagrams of hydraulic circuits 140, 142 and 144 which may be used advantageously in the present steering system. In circuit 140 pump 14 is connected to a steer device such as a double rod steer cylinder 150 by hydraulic lines 152 and 154 from ports 50 and 52 in the pump. Pilot operated check valves 156 and 158 are disposed in hydraulic lines 152 and 154, respectively, and have pilot lines 160 and 162 connected to the other of lines 152 and 154 than that in which the valve is disposed. Operating fluid for the hydraulic circuit is provided from reservoir 164 through a hydraulic line 166 having a lightly loaded check valve 168 and a shuttle valve 170 spring loaded as shown in the drawing with a pilot line 171 from hydraulic line 152. Hydraulic lines 172 and 174 from the shuttle valve provide a passage for the hydraulic fluid to or from one or the other side of steer cylinder 150 at lines 152 and 154. A hydraulic line 176 forms a loop from shuttle valve 170 to hydraulic line 166 between reservoir 164 and check valve 168, and has an orifice 178 and a pressure relief valve 180 with a pilot line 182 disposed therein. A hydraulic line 184 having a lightly loaded check valve 186 is disposed between hydraulic line 176 and line 166 between check valve 168 and shuttle valve 170. Thus, for example, if pump 14 is adjusted to pump hydraulic fluid through check valve 156 and line 152, the spool of shuttle valve 170 is sequenced to the right against its biasing spring, causing the piston of cylinder 150 to move to the right. Back pressure in the system operates through pilot line 162 to open check valve 158, thereby allowing fluid coming from cylinder 150 to pass through check valve 158 and pump 14. If the cylinder bottoms out and pump 14 continues to pump, fluid will pass through valve 170 and pilot line 182 to open release valve 180, thereby allowing fluid to pass through the release valve, hydraulic line 176, check valve 186, shuttle valve 170 and check valve 158 to pump 14.

If the pump operates in the opposite direction from that just described, fluid passes through check valve 158, shuttle valve 170 remains in the position shown in FIG. 5, and the fluid forces the piston of cylinder 150 to the left as shown in the diagram. Back pressure in the line operates through pilot line 160 to open check valve 156, thereby permitting fluid to pass through check valve 156 and pump 14. If the piston of cylinder 150 bottoms out in this position and pump 14 continues to pump, the fluid passes through shuttle valve 170, pressure relief valve 180, check valve 186, back through the other side of shuttle valve 170, and through check valve 156 to pump 14. Makeup oil is permitted to enter the system through check valve 168 when both sides of the circuit are underpressurized due to a fluid volume deficiency.

A feature of the hydraulic circuit 140 which makes the circuit particularly advantageous is that the circuit provides high temperature pressure relief. If both sides of the circuit become overpressurized due to elevated working temperatures, a small amount of fluid will pass through orifice 178 to reservoir 164. This occurs when the elevated pressure in line 152 causes the spool of shuttle valve 170 to sequence to the right against the biasing spring. Pressure in the right side of the circuit is then blocked from reaching orifice 178 and reservoir 164 by check valves 168 and 186; however, the greater pressure forces the piston of cylinder 150 slightly to the left, thereby displacing some fluid from the left side of the cylinder. The fluid displaced from the left side of cylinder 150 passes from the left side of the circuit through pressure relief valve 180 to orifice 178 and into reservoir 164. Check valves 156 and 158 prevent normal load reactive forces, such as castering, from moving the piston of cylinder 150. If the check valves are removed from the circuit the system becomes load reactive, giving the driver feedback feel.

In hydraulic circuit 142 similar numbers designate parts similar to those of the previously described circuit. Pump 14 pumps fluid through hydraulic lines 152 and 154 to move the piston of cylinder 150 either to the right or left. Hydraulic lines 190 and 192 are disposed between lines 152 and 154 and have disposed therein relief valves 194 and 196, respectively. Pilot lines 198 and 200 for relief valves 194 and 196 are connected such that an overpressure in line 154 causes relief valve 194 to open, permitting fluid to pass therethrough to line 152. An overpressure in line 152 causes relief valve 196 to open, thereby permitting the passage of fluid to line 154. A third hydraulic line 202 between lines 152 and 154 is connected to reservoir 164, and check valves 204 and 206 open to permit makeup fluid to pass into either side of the system. This particular circuit provides no pressure relief if both sides of the circuit are overpressurized as in the previous system. Load reactions, such as castering, cause cylinder 150 to move, thereby driving pump 14 and giving feedback and feel to the operator. The addition of check valves in lines 152 and 154, such as valves 156 and 158 in the previous circuit, causes the circuit to become nonreactive.

FIG. 7 is a schematic view of yet another hydraulic circuit which may be used for the present steering system mechanism In circuit 144 hydraulic pump 14 is connected by hydraulic lines 152 and 154 to opposite sides of hydraulic steer cylinder 150. Fluid circulated by pump 14 will drive the piston of the cylinder to either the right or left as in the previous circuits. The steering system can be either load reactive or nonreactive, depending upon whether or not check valves are disposed in hydraulic lines 152 and 154. A hydraulic line 210 is disposed between lines 152 and 154 and contains check valves 212 and 214. A second hydraulic line 216 is disposed between hydraulic lines 152 and 154 and contains a pair of check valves 218 and 220 which, as can be seen in the drawing, permit fluid flow in the direction opposite from that of valves 212 and 214. A hydraulic line 222 is disposed between lines 210 and 216 and contains a relief valve 224 with a pilot line 226. Reservoir 164 communicates with the system through hydraulic line 228 having an orifice 230.

If the hydraulic circuit shown in FIG. 7 bottoms out to the right and pump 14 continues to operate, fluid passes from line 152 through check valve 212 but will not flow through check valve 214 to line 154. The increased fluid pressure in hydraulic line 222 operates through pilot line 226 to open pressure relief valve 224, thus permitting the flow of fluid through the relief valve. Check valve 220 will open, permitting the flow of fluid to line 154 and pump 14. The system shown in FIG. 7 is symmetrical; hence, if the piston of cylinder 150 bottoms out to the left and pump 14 continues to pump, fluid will pass from line 154 through the check valve 214, hydraulic line 222, relief valve 224, check valve 218 and hydraulic line 152 back to pump 14. The circuit of FIG. 7 also has pressure relief for overpressurization in both sides of the circuit which may result from expansion due to overheating, in that if both sides of the circuit become overpressurized, fluid will flow through check valves 212 and 214 into hydraulic line 222 and through relief valve 224 and orifice 230 into reservoir 164. If either side becomes underpressurized, makeup oil can enter the system through check valves 218 or 220.

In the use and operation of power steering system 10, rotation of a steering wheel will cause rotation of intermediate shaft 76 and a small axial displacement of intermediate shaft 76 due to engagement with threads 80. The axial displacement of intermediate shaft 76 causes tension and compression to be transmitted via bearing 102 to tube 88, which results in strain gages 130, 132, 134 and 136 emitting signals via a Wheatstone bridge to activate servo motor 12. Servo motor 12 operates the pump to control steer cylinder 150. Operation of the pump continues until rotation of shafts 30, 38 cause an "unwinding" of threads 80, which results in relieving tension and compression forces in tube 88 and a halt of signals generated by the strain gages, thus resulting in stopping of motor 12. More specifically, with any one of the three disclosed hydraulic circuits, or with any other suitable hydraulic circuit, steering commands from the vehicle oeprator are initiated by turning of a steering wheel, not shown in the drawings, which rotates steering shaft 60 either to the right or left. The torque thus applied to steering shaft 60 is transmitted through the spline connection to intermediate shaft 76. The rigid axial mounting of tube 88 and the interconnection by bearing 102 between the tube and intermediate shaft 76 cause the portions of the tube on opposite sides of the bearing to undergo opposite types of axial stress. Thus, for example, right hand torque applied to steering shaft 60 may cause the end of tube 88 to the right of bearing 102 in the drawing to undergo axial compression while at the same time the end of the 88 to the left of the bearing undergoes axial tension. Conversely, a left hand torque applied to steering shaft 60 may cause the right hand portion of tube 88 to undergo axial tension while the left hand portion of tube 88 undergoes axial compression. The type and degree of axial stress are detected by strain gages 130, 132, 134 and 136, and the detection of stress is relayed to the bi-directional amplifier which activates bi-directional servo motor 12. The servo motor causes gear box output shaft 56 to rotate and eccentric end 58 thereof to move in an orbital path, thus causing rotor 22, which is connected to the eccentric end, to orbit in stator 24. If, as previously explained, a 6 to 1 mechanical advantage is obtained from gear box 16, and if pump 14 provides a further 6 to 1 mechanical advantage, servo motor 12 has a 36 to 1 mechanical advantage in driving rotary shaft 38. If, for example, an additional 10 to 1 hydraulic advantage exists from shaft 38 to steer cylinder 150, the servo motor will have a 360 to 1 advantage with respect to steer angle generation. One full revolution of the armature in motor 12 will result in 1 degree of steer angle change. If full left steer to full right steer covers a range of about 180° in steer angle change, and is to be accomplished in approximately five seconds, servo motor 12 will turn at about 180 turns per five seconds, or approximately 2,160 rpm.

Tube 88 and bearing 102 are of sufficient strength and load bearing capacity to enable manual input steering commands to be transmitted to pump 14 to cause the pump to circulate fluid for manual steering. Threads 78 of shaft 76 are permitted to turn on to, or off of threaded end 80 by only a small amount; hence, the threaded connection permits manual operation of the pump. Thus, even if electrical power is lost, a vehicle having the present power steering system can still be controlled, and in the example just given, the operator will have a 10 to 1 advantage between the steering wheel and steer cylinder 150. All the components of the present power steering system, beginning with the steering wheel and steering shaft 60 and extending through to tachometer 21, are arranged in coaxial alignment, thus providing a compact and space saving power steering arrangement. This arrangement of components, wherein the servo motor and tachometer are at one end of the assembly, and a steering wheel, steering shaft assembly and steering input sensing mechanism are at the other end of the assembly, provides manual steering input to one end of pump 14 and powered servo motor inputs to the other end of the pump. The pump operates only in response to steering command inputs; thus, the servo motor, pump, and gear box will have extended life expectancies in that they will not operate continuously while the vehicle is running. Since, in normal operation, industrial vehicles and the like are guided through only moderate steer angle changes, the pump and motor will operate only occasionally and for short periods of time at reduced output. Thus, noise and heat generation are substantially reduced. Noise from the power steering system is detectable only when rapid and continuous wide angle steer changes are required, and the end to end coaxial alignment of components facilitates dissipation of the moderate amounts of heat which occur during operation of the present system.

A strain gage, brush and slip ring arrangement operating directly on shaft 76 could be utilized in steering input sensing mechanism 18, in which case tube 88 would be eliminated; however, such an arrangement of parts would be more complex and less durable than that disclosed previously. The disclosed arrangement, utilizing a shaft, bearing and tube with strain gages wired in a Wheatstone bridge arrangement, is preferred in that the construction thereof is rugged and has few moving parts. Torque is mechanically converted to axial force, thus eliminating the need for slip rings and brushes, and the strain edges of the present power steering system may be hard wired to tube 88.

The hydraulic circuitry disclosed provides means for creating either load reactive or load nonreactive steering systems, and one side over pressurization due to bottoming out of the steer cylinder and two side over pressurization due to expansion from heat or the like are automatically relieved. If under pressurization occurs, makeup oil is added from the reservoir.

Although one embodiment of a power steering system and several hydraulic circuits therefor have been shown and described in detail herein, various changes may be made without departing from the scope of the present invention.

We claim:

1. A power steering system comprising a hydraulic pump for supplying pressurized fluid to a steer device, a servo motor for operating said pump, a reduction gear box disposed between said servo motor and said pump, a steering shaft assembly through which steering commands are initiated, means for detecting the direction and intensity of the steering commands initiated through said steering shaft assembly and for activating said servo motor to operate said pump when the steering commands are detected, and control means for maintaining the speed and torque of said servo motor at desired levels, said servo motor, said pump, said means for detecting the steering commands, and said steering shaft assembly being in coaxial alignment.

2. A power steering system as defined in claim 1 in which said servo motor and said reduction gear box are disposed on the opposite side of said pump from said steering shaft assembly.

3. A power steering system as defined in claim 1 in which said means for detecting the steering commands includes means for mechanically translating torque applied to said steering shaft assembly to detectable axial stress.

4. A power steering system as defined in claim 3 in which strain gages are provided for detecting said axial stress and for initiating a signal to activate said servo motor in response thereto.

5. A power steering system as defined in claim 1 in which an intermediate shaft is disposed between said pump and said steering shaft assembly, for conveying manual steering inputs to said pump.

6. A power steering system as defined in claim 1 in which said pump is an orbit pump and said reduction gear box includes an output shaft having an eccentric end for driving said pump.

7. A power steering system as defined in claim 5 in which a tube surrounds said intermediate shaft, and connecting means are disposed between said tube and said intermediate shaft for translating torque applied to said intermediate shaft to axial stress on said tube.

8. A power steering system as defined in claim 7 in which strain gages are attached to said tube for detecting the axial stresses thereon and for initiating a signal to activate said servo motor when axial stress is detected.

9. A power steering system as defined in claim 5 in which said intermediate shaft is connected to said pump, a tube surrounds said intermediate shaft and is relatively immovable longitudinally between said steering shaft assembly and said pump, and a bearing having inner and outer races is disposed between said intermediate shaft and said tube, said inner race being disposed on said intermediate shaft and being restrained from longitudinal movement thereon, and said outer race being disposed against the inner surface of said tube and being restrained from longitudinal movement with respect to said tube.

10. A power steering system as defined in claim 9 in which strain gages are disposed on said tube for detecting the axial stresses thereon and for initiating a signal to activate said servo motor when axial stress is detected.

11. A power steering system as defined in claim 9 in which said steering shaft assembly and said intermediate shaft are disposed on one side of said pump, and said servo motor and said reduction gear box are disposed on the opposite side of said pump and said steering shaft assembly, said intermediate shaft, said pump, said reduction gear box and said servo motor are in coaxial alignment.

12. A power steering system as defined in claim 11 in which said pump is an orbit pump and includes a housing, a rotor and stator disposed near one end of said housing, ports for the passage of fluid to and from said pump disposed near the opposite end of said housing, and a rotary shaft having channels through which fluid pumped by said rotor and stator passes between said ports.

13. A power steering system as defined in claim 12 in which said rotary shaft extends outwardly from said housing through the end of said housing opposite said rotor, the end opposite said outwardly extending end of said rotary shaft has a longitudinal bore therein, and a shaft is disposed in said bore, extending outwardly therefrom and being connected to said rotor.

14. A power steering system as defined in claim 13 in which said reduction gear box includes an output shaft having an eccentric end for driving said pump.

15. A power steering system as defined in claim 14 in which a bearing is disposed in a bore of said rotor and said eccentric end of said output shaft from said reduction gear box is journaled in said bearing.

16. A power steering system comprising a hydraulic orbit pump, means for relaying manual steering commands through one side of said pump, means including a servo motor and a gear box disposed between the servo motor and said pump for relaying power assisted steering commands through the opposite side of said pump, said gear box having an output shaft in coaxial alignment with said pump and said servo motor, an eccentric end on said shaft for driving said pump, and a steering input sensing means for detecting the steering commands to activate said servo motor when steering commands are detected, said first mentioned means, said pump and said second mentioned means being in coaxial alignment.

17. A power steering system as defined in claim 16: the further improvement in which a manually operated drive means is provided for said pump and includes a manually driven shaft extending into said pump on the opposite side of said pump from said motor.

* * * * *